July 28, 1931. N. DEISCH 1,816,112
SIGNALING OR INDICATING DEVICE
Filed March 5, 1928 2 Sheets-Sheet 1

Inventor
Noel Deisch

July 28, 1931.   N. DEISCH   1,816,112
SIGNALING OR INDICATING DEVICE
Filed March 5, 1928   2 Sheets-Sheet 2

Inventor
Noel Deisch.

Patented July 28, 1931

1,816,112

UNITED STATES PATENT OFFICE

NOEL DEISCH, OF WASHINGTON, DISTRICT OF COLUMBIA, ASSIGNOR OF ONE-HALF TO THOS. E. STONE, JR., OF SCARSDALE, NEW YORK

SIGNALING OR INDICATING DEVICE

Application filed March 5, 1928. Serial No. 259,329.

My invention relates to signaling or indicating devices, and more particularly to devices of this character relying on an application of color or color change.

The principal object of the invention, generally stated, is to provide a color indicating or signaling device the color of which is continuously variable through a certain range of hues, to the end that values of the subject matter of the indication may be shown by corresponding prearranged values of the signal. Thus, for example, a definite value of a certain quantity, quality, relation, or condition may be denoted by a particular hue or color of the dial or indicating portion of a measuring instrument, and a change of value may be denoted by a corresponding change in the hue or color of said dial or indicating portion of the instrument.

Another object of the invention is to provide a device, adaptable to manual or mechanical operation, in which a change of color, bearing certain definite implications related to the subject matter to be signaled or indicated, is produced by shifting a line grating consisting of alternate opaque and transparent lines over a coacting grating consisting of lines of contrasting colors.

Another object of the invention is to provide an indicating device, which may be incorporated as a component part of a detecting, measuring, or other instrument, and which includes means permitting easy adjustment or calibration of the instrument or device of which it is a component, to the end that an indication of a particular quality may be brought into definite relation with a particular scalar value of a quantity being measured.

Another object of the invention is to provide an indicating device adapted to give an indication of a certain quality at all scalar values above a given level of the quality measured, and an indication of a different quality at all scalar values below a second given level of the quantity measured.

Other objects and advantages of the invention relating to the particular arrangement of the various parts will become apparent as the description proceeds.

Referring to the drawings.

The requirements governing the practical application of certain measuring and indicating instruments are sometimes such that the visibility of the indication is of first importance, whereas the precision of the indication is governed by very wide tolerances. Such, for example, is the case as respects the indication of the temperature of the cooling water of internal combustion engines and the running temperature of bearings; or again, the effective pressure in certain specialized pressure apparatus, as the ballonets of airships; or again, the velocity of a certain medium, such as, for certain aeronautical purposes, the ground speed of the wind, and the like.

In these cases a merely qualitative indication, or at most an indication only roughly quantitative, is adequate, while on the other hand it is highly desirable that the instrument be readable from some distance and at a glance. In the present invention the desired visibility is attained by providing a visual signal of any convenient area, the arrangement being such that pronounced changes of visual characteristics over the whole area of the signal may be produced by a given quantity of change of the measured condition. The visual change referred to may consist of a change of brightness or of hue, or both, the preferred arrangement combining these factors in a change of color, as secured preferably by the use of pigments.

Figure 1:
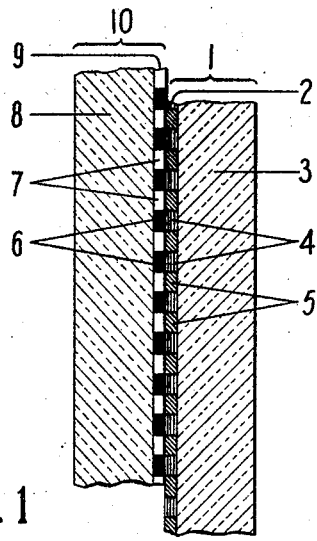
Fig. 1 is a diagrammatic cross sectional view of two coacting gratings, and illustrates the general principle on which the invention is based.

The optical principle on which the invention is based is shown in diagram in Fig. 1, which represents a section of two grating members 10 and 1, juxtaposed in face-to-face relation. The grating member 10 consists of a base or support 8, which may be a glass plate, bearing the grating proper 9, which latter consists of a series of opaque linear elements 6 parallel along their main axes (which axes in the drawing must be supposed to extend normally to the plane of the printed sheet) and equally spaced, the width of which, in the case illustrated, is equal to the width of the interspaces 7. The grating member 1 also consists of a support 3, bearing a grating 2 consisting of two series of elements 4, 5 of substantially equal width, the members of each series being of substantially identical hue, whereas the hue of the two series is distinguishable.

It is apparent that light, incident on either face of the compound grating, will be transmitted only through the interspaces 7 between the opaque elements 6 of the grating 9. This light will be further transmitted by that one of the elements 4 or 5 in the color grating 2 which, with the two gratings in the relation then obtaining, lies immediately before the transparent interspaces 7 of the grating 9. The light transmitted by the compound grating will hence obviously be of a hue corresponding to the hue of the elements exposed through the interspaces 7. In Fig. 1 this color is represented as being green. If certain portions of both elements 4 and 5 are exposed through the interspace, the hue of the emergent light will be the additive resultant of the respective areas of the two color elements thus exposed, for in the preferred arrangement of the invention the distance between the observer and the instrument will be so great that the eye will be unable to resolve the separate grating elements, these latter appearing to fuse into a homogeneous area, that is to say, to integrate themselves into a single effect.

By gradually shifting one grating over the other in direction perpendicular to the main axes of the grating elements, through half the spacing interval, a complete change of color extending over the entire area of the compound grating will occur. Thus, assuming the sets of elements 4 and 5 in Fig. 1 to be colored red and green, respectively, the pigments being of proper absorption characteristics, a change of hue from red, to orange, to yellow, to yellowish-green, to green, will occur during a shift through the width of one grating element. It may be noted parenthetically that the combination of green and red in the two sets of color elements will be one frequently used, because of the common association of these two colors with safety and danger, and their wide use as signals.

Figure 2:
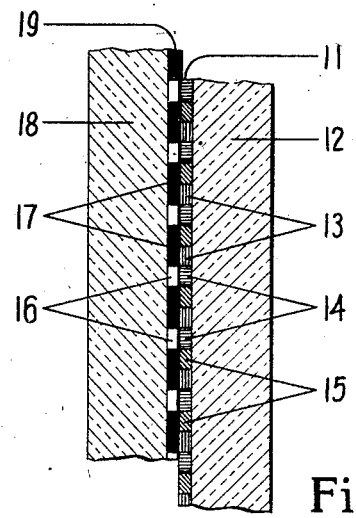
Fig. 2 is a view similar to Fig. 1, but shows a modified arrangement of the grating elements.

By providing a color grating of a greater number and diversity of elements, acting in conjunction with a suitably designed complimentary opaque line grating, a greater range of color may be had. Thus, in Fig. 2, the grating 11 consists of three kinds of color elements, 13, 14, and 15, all of equal width. The opaque elements 17 of the line grating 19 are of double the width of the transparent interspaces 16, and also of double the width of the color elements 13, 14, or 15, of the color grating 11. If it be assumed that the three classes of elements of the color grating 11 are colored respectively red, blue, and green, as shown in Fig. 2, a progressive shift from the blue position along the screen in the proper direction, corresponding to an upward movement of the grating 11 in the figure will produce the following sequence of colors: blue, blue-green, green, yellowish-green, yellow, orange, red, magenta, purple. If the grating be moved beyond this position, the cycle of colors will be repeated, and this succession will continue through the entire distance over which the movement occurs.

The opaque line grating and the color line grating referred to may be produced by any of the recognized methods. Thus, the opaque line grating may be made by ruling or etching shallow troughs in a glass plate and filling these with an opaque material such as lampblack and a suitable binder. Or it may be made by photographically printing on a suitable photosensitive surface, or by any suitable mechanical printing process. Likewise the color grating may be made by a photographic process such as the gelatine-bichromate process or the imbibition process, or, finally, by mechanical printing from a line etching or especially from an offset plate. Either type of grating may be made by fusing vitrifiable colors into a glass or porcelain support.

It will be apparent, of course, that either one or the other of the screen supports 3, 8, or 12, 18, may be made of a reflecting material, such as opal glass, and that in this case the instrument will be read by reflected rather than by transmitted light. Again, the elements of the color gratings 2 or 11 may be intrinsically of a reflecting nature, and in this case also the instrument may be read by reflected light.

Figure 3:
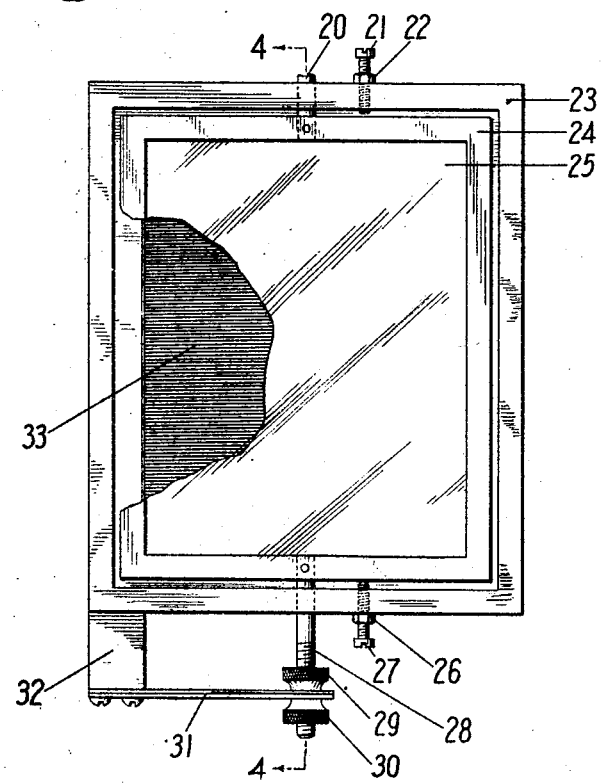
Fig. 3 is a front elevation of an embodiment of the invention in which the grating elements are carried on flat plates one of which has linear freedom, and also illustrates an application of the invention to a temperature measuring instrument.
Figure 4:
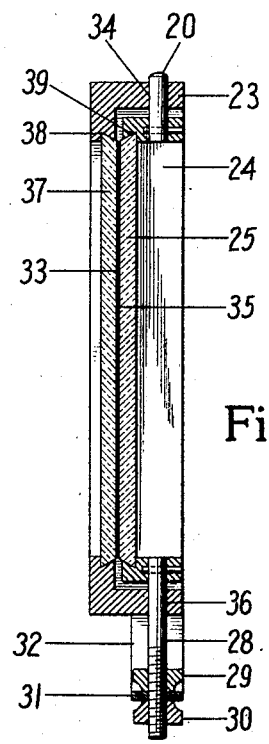
Fig. 4 is a section on the line 4, 4 of Fig. 3.

Referring now to Fig. 3 and Fig. 4, which illustrate an embodiment of the invention, there is shown a fixed frame 23 holding firmly secured in a recess 38 a grating support 37 carrying a grating 33, and a second and movable frame 24 holding in a recess 39 a grating support 25 carrying a grating 35. The frame 24 with its associated grating 35 has freedom in a direction perpendicular to the main axes of the grating elements through the action of the guide-rods 20, 28, which slide in guide-waves 34, 36, provided in the fixed frame 23.

Threaded on an extension of one of the guide-rods 28 are the adjusting screws 29, 30, by means of which the point of attachment of the actuating means may be varied along the length of the rod, thus adjusting the grating 35 along its axis of motion with respect to the grating 33. By this provision, it is obvious, the instrument may be calibrated to give a definite color indication at a given scalar value of the condition or relation measured. Threaded through the frame 23 are the adjustable abutment stops 21, 27, with associated lock-nuts 22, 26, by which the grating member 25 is restrained from moving through more than a definite interval. At all scaler values above a certain level of the quantity measured the grating 35 will be held in one position, and at all scalar valves below a second level of the quantity measured it will be held in the other position, the indication being continually of the one quality in the one position and of the other quality in the other position, and showing a transition of quality only in the interval between the two levels.

It will be apparent that the construction thus far described may be used in diverse connections, since the rod 28 may be attached to any suitable or preferred operating means. By way of illustration only the rod 28 is here shown attached to a bimetallic thermostatic strip 31 supported on the projection 32 of the frame 23. When the thermostatic strip is warped by a change of temperature, the motion of its free end, communicated through the rod 28 to frame 24, moves the latter and its attached grating 35 over the contacting grating 33 thereby causing the succession of color effects described above. Although the instrument as shown in Fig. 3 and Fig. 4, therefore, constitutes a temperature indicating instrument, it will be understood that no such limitation is contemplated, and that any instrumental or other means for moving the junction rod 28 might have been used in the illustration.

It will furthermore be obvious that rotary freedom may be substituted for linear freedom in the juxtaposed plates, or the shape of the plates or grating supporting surfaces may be changed, without departing from the spirit or purpose of the invention.

Figure 5:
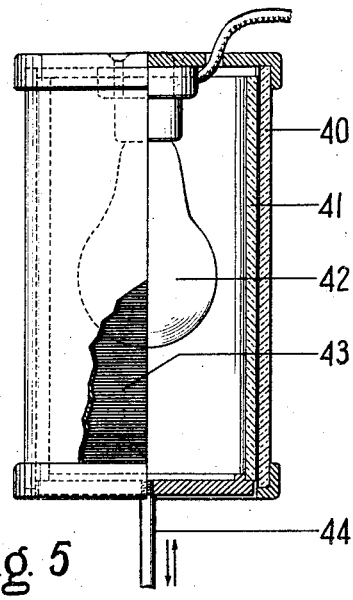
Fig. 5 is a view, partly in section, showing an embodiment of the invention in which the grating elements are carried on coaxial cylinders, one of which cylinders has freedom along the mutual axis of the cylinders.
Figure 6:
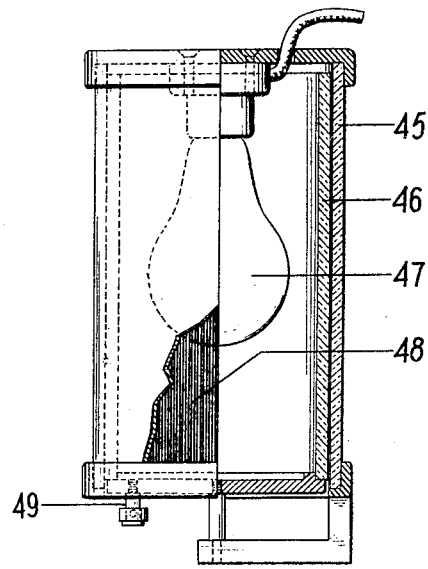
Fig. 6 is a view, partly in section, showing an embodiment of the invention in which the grating elements are carried on coaxial cylinders, one of which cylinders has freedom about the mutual axis of the cylinders.

As an illustration of such an alternative arrangement, an embodiment of the invention is shown in Fig. 5 and Fig. 6, wherein coaxial cylinders fitting one over the other are employed as grating supports, and in which is also illustrated the incorporation of an artificial illuminating means within the indicating device to promote visibility.

Referring to Fig. 5, 40 is a fixed grating support, and 41 a movable grating support, the grating elements carried by which are arranged circumferentially of the cylinders, as shown at 43. The movable grating support 41 bears in fixed relation to itself the junction rod 44, the free end of which may be attached to any suitable instrumental actuating means capable of giving it motion in the direction indicated by the arrows, thus imparting an appropriate linear motion to the grating support 41. The light source 42 serves to illuminate the indicator.

Figure 7:
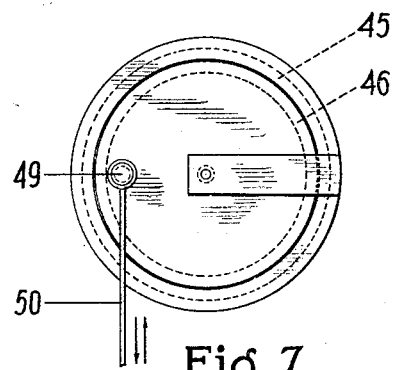
Fig. 7 is a bottom plan view of Fig. 6.

In Fig. 6 and Fig. 7 the grating supports are arranged as in Fig. 5, 45 being the fixed support and 46 the movable support. The grating elements in this case are oriented as shown at 48, that is, longitudinally of the cylinders. The junction rod 50, which may be attached to any suitable actuating means, and which acts through the pin 49 held in fixed relation with the grating support 46, moves in the direction indicated by the arrows, imparting an appropriate rotatory motion to the grating support 46. A light source 47 illuminates the indicator.

Figure 8:
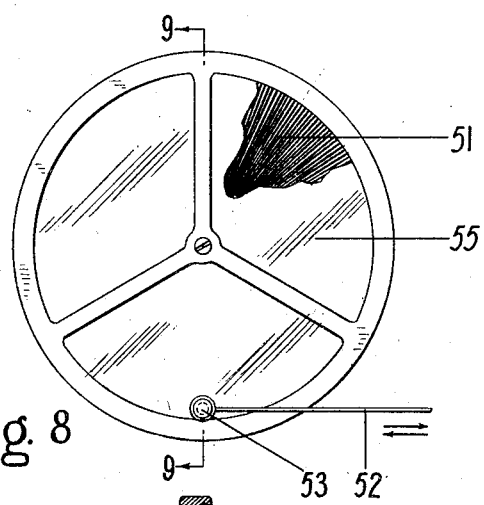
Fig. 8 is a view, partly in section, showing an embodiment of the invention in which the grating elements are carred on flat plates, one of which is pivoted and has rotational freedom.
Figure 9:
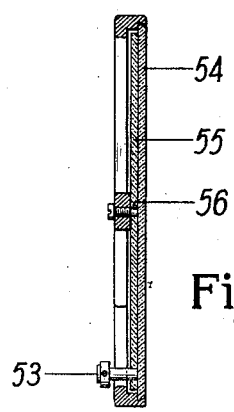
Fig. 9 is a section on the line 9, 9 of Fig. 8.

Referring to Fig. 8 and Fig. 9, still another arrangement of the invention is shown, in which 54 is a flat fixed support and 55 a flat movable support pivoted at 56, and bearing grating elements oriented as shown at 51, that is, radially. The junction rod 52, which may be attached to any suitable actuating means, and which acts through the pin 53, secured to the grating support 55, serves to give an appropriate rotational movement to the grating support 55.

It will further be obvious that instead of the pin-and-rod turning means illustrated at 49, 50, in Figs. 6 and 7, and at 53, 52, in Figs. 8 and 9, a Bourdon tube or other actuating device capable of giving a direct turning moment to the cylinder or disk, respectively, might be used. It is also apparent that the detecting component of the measuring instrument (which might be, for example, the bulb portion of a vapor-pressure thermometer) might be placed at a considerable distance from the indicating component of the instrument, following already established practice in distant reading instruments.

Further, as respects the gratings proper, it will manifestly be possible to use other color combinations than those suggested, or to adopt a different ratio governing the widths of the elements of the opaque or of the color line grating. Thus a workable combination having certain advantages could be had by assembling an opaque line grating whose ratio of opaque element to transparent interspace were 1:2 (rather than 2:1, as shown at 19 in Fig. 2), in relation with a compound tri-colored grating of the type shown at 11 in Fig. 2. In this case the widths of the opaque elements in the opaque grating is made to equal the widths of the color elements in the color grating.

While I have described my invention in detail with respect to preferred forms thereof, I do not desire to be limited to the forms described, since many changes or modifications may be made in these forms without departing from the spirit and scope of my invention, and I desire to cover all modifications and forms coming within the scope of the appended claims.

What I claim, is:

1. A signaling or indicating device including a color signal made up of a plurality of discrete and distinguishable color elements, said color elements being of a dimension such that the aggregate of elements fuse into a substantially homogeneous visual effect at the normal distance at which the signaling or indicating device is observed, means for selectively limiting the visible area of said color elements to define the quality of said homogeneous visual effect, and means responsive to a quantity to be indicated, to change the relation of said area-limiting means to said color elements to cause a change of quality in the homogeneous visual effect.

2. A signaling or indicating device comprising a composite color signal consisting of distinctive color elements the visual angle of which is so small at the normal working distance of the signal that said elements are not separately resolvable, and means responsive to a quantity, relation, or condition to be indicated, for selectively masking said color elements of said signal to convey intelligence relative to the subject matter to be signaled or indicated.

3. A signaling or indicating device comprising a composite color signal resolvable into components individually of homogeneous but severally of heterogeneous hue; and means, responsive to a quantity, relation, or condition to be indicated, whereby certain sets of components may be differentially exposed or occulted.

4. A signaling or indicating device comprising a plurality of spaced elements of more than one distinctive visual quality arranged in cyclically recurring order; comprising also a plurality of spaced opaque elements adapted to selectively mask said first mentioned elements, and means actuable by a force generated by a quantity to be indicated, to change the masking relation of said two sets of elements.

5. An indicating device comprising a plurality of equally spaced, thin, linear opaque elements coacting with a plurality of equally spaced, thin, linear color elements, and means actuable by a force generated by a quantity or condition, to be measured by which said opaque elements are moved to selectively mask said color elements to produce a color effect of a quality corresponding at any setting to a definite value of the quality, relation, or condition to be measured.

6. An indicator for measuring instruments including two juxtaposed relatively movable line gratings, one of said gratings composed of a plurality of equally spaced alternately opaque and transparent linear elements, the other of said gratings composed of a plurality of equally spaced linear color elements arranged in sets, the elements of any one set being of similar hue, the relative spacing of the color elements being such that the integrated color visible through the transparent interspaces of the opaque line grating is substantially of constant quality over the entire area of said grating and means actuable by a force generated by a quantity or condition to be measured whereby one of said line gratings is moved over the other line grating to produce a color effect of a quality corresponding at any setting to a definite value of the quality, relation, or condition to be measured.

7. An indicator for measuring devices including a plurality of coacting gratings comprising differently colored thin linear elements, and means actuable by a force generated by a quantity or condition to be measured to effect a relative displacement of elements of the gratings to give a variable color effect.

8. An indicating device including coacting relatively movable line gratings, comprising opaque lines and lines of one or more distinguishable colors so arranged that the colored lines may be differentially exposed through the interspaces between the opaque lines to give a variable color effect, the quality of said color effect at any given setting corresponding to a definite value of the quality, relation, or condition to be measured.

9. A signaling or indicating device comprising two coacting gratings in apposed relation, the elements of one of said gratings being alternately opaque and transparent, the elements of the other of said gratings being composed of distinguishable colors systematically arranged, whereby an integrated color is produced the quality of which is dependent on the relative position of overlap of the elements of said gratings, and means actuated by a force generated by an instrumentally measurable condition or relation to move one of said gratings relatively to the other grating to produce a color corresponding to a particular condition to be indicated.

10. An indicating device comprising two mutually movable juxtaposed coacting gratings, one an opaque line grating and the other a multicolor line grating, said gratings being adapted to produce a change of integrated color through a certain range of colors depending on the overlapping relation of the elements of said gratings, and means responsive to a quantity, relation, or condition to be indicated, to move the gratings into different positions of overlap to produce colors corresponding to definite values of the quantity to be measured.

11. An indicating device for measuring instruments comprising two mutually movable juxtaposed coacting gratings, and comprising also connecting means for receiving and transmitting to one of the gratings the applied force of the measuring component of the instrument, and means for altering the relation of said connecting means to the force-generating means to allow of calibrating the instrument.

12. An indicating device for measuring instruments including relatively movable gratings comprising opaque lines and lines of distinguishable colors so arranged that the colored lines may be moved apparently between the opaque lines to give a variable color effect, means to guide the gratings in their relative movement, and operating means actuable by a force generated by the condition to be measured.

13. An indicator comprising relatively movable line gratings mounted on supports whose opposed surfaces represent figures of revolution, and means for effecting the relative movement of one grating over the other grating about the common axis, whereby the lines of the one grating are moved in a curvilinear path over the lines of the other grating.

14. A temperature indicating instrument comprising relatively movable supports carrying coacting gratings comprising differently colored thin linear elements, means for generating a force under the influence of temperature changes, and means for transmitting such force from said meanus to one of said supports to cause relative movement of said gratings.

15. A temperature indicating instrument including relatively movable supports carrying coacting optical gratings, a thermo-responsive element adapted to change its form under the influence of temperature changes, and means for causing one of said supports to move in unison with the changes of form of said thermo-responsive element.

16. A temperature indicating instrument comprising a frame, a support carrying a grating fixed in said frame, a second support carrying a grating adapted to move relatively to said frame, means for guiding the movement of said movable support, bimetallic thermostatic means capable of spontaneous movement under the influence of temperature changes, and means for transmitting the movement of said bimetallic means to one of said movable supports to cause relative movement of said gratings.

17. A temperature indicating instrument comprising a frame, a support carrying a grating fixed in said frame, a second support carrying a grating adapted to move within said frame, means for guiding the movement of said movable support, a thermo-responsive medium adapted to expand and to contract under the influence of temperature changes, means actuated by the expansive force of said medium for moving said movable support in one direction, and means actuated by the contractive force of said medium for moving said movable support in an opposite direction.

18. A temperature indicating instrument comprising a frame, a support carrying a grating fixed in said frame, a movable frame, a second support carrying a grating fixed in said movable frame, a motion transmitting member in engagement with said movable frame, bimetallic thermostatic means adapted to actuate said motion transmitting member, and means limiting the extent of movement of said movable frame.

19. A temperature indicating instrument comprising a frame, a support carrying an optical grating fixed in said frame, a movable frame, a second support carrying an optical grating fixed in said movable frame, a motion transmitting member in adjustable engagement with said movable frame, bimetallic thermostatic means adapted to actuate said motion transmitting member, and adjustable means limiting the extent of movement of said movable frame.

20. A temperature indicating instrument comprising a frame, a support carrying a grating fixed in said frame, a movable frame, a second support carrying a grating fixed in said movable frame, one of said gratings comprising a plurality of spaced, thin, linear color elements, the other of said gratings comprising a plurality of spaced, thin, linear opaque elements adapted to selectively mask said color elements to produce a color effect which is different at different relative positions of said gratings, a motion transmitting member in adjustable engagement with said movable frame, bimetallic thermostatic means adapted to actuate said motion transmitting member, and adjustable abutting means to arrest said movable frame at a position corresponding to a desired color effect.

In testimony whereof I affix my signature.

NOEL DEISCH.